United States Patent Office 3,458,442
Patented July 29, 1969

3,458,442
FRACTURING FLUID COMPOSITIONS
John D. Floyd, Wilmington, and Martin J. O'Connor, Newark, Del., assignors to Hercules Incorporated, a corporation of Delaware
No Drawing. Filed Mar. 7, 1966, Ser. No. 532,086
Int. Cl. E21b 43/00
U.S. Cl. 252—8.55                3 Claims

ABSTRACT OF THE DISCLOSURE

A fracturing fluid composition having the constituents water, friction reducing agent, suspending agent, and rosin acid dimer.

---

The present invention relates to improved fluids and the treatment of subterranean formations therewith and particularly to fluids having improved fluid loss and solubility properties for treatment of depleted oil wells to increase the flow therefrom.

In wells which no longer produce economically by primary recovery methods (i.e. "depleted" wells), it is common practice to force the formation open (called "fracturing") by passing a fluid into the formation under elevated pressure. This causes the oil or other product being produced by the well to start flowing again from the formation.

The main ingredients of known fracturing fluids include water, a suspending agent and a friction reducing agent. Oil based fracturing fluids are known also but water based fluids are by far the most widely used. The main purpose of the suspending agent is to hold materials (e.g. sand or other finely divided particles such as walnut hulls, etc.) in suspension in the fracturing fluid, said materials being used as "propping" agents to hold the fracture open after the fracturing operation has been completed. The purpose of the friction reducer is to impart low friction loss properties to the fracturing fluid (i.e. to give low friction between the fracturing fluid and equipment used) so that large volumes of fracturing fluid can be pumped rapidly into the formation with a minimum amount of work.

Heretofore the major difficulty has been to provide a fracturing fluid (1) which has fluid loss properties to the desired low degree and (2) which also flows readily from the formation along with the oil or other product being produced. Thus a fracturing fluid is needed which can be readily passed under elevated pressure into the main fissures to be fractured without any substantial amount of the fracturing fluid escaping into the smaller veins, form a cake on the walls of the main fissures with low fluid loss properties, and which is capable of readily flowing from the well along with the oil or other product being produced. The reason why a fracturing fluid of low fluid loss properties is needed is obvious. The reason why a fracturing fluid should readily flow from the well along with the oil being produced is that otherwise it would decrease the porosity of the formation and thus restrict the flow of oil therefrom. In order to meet this latter condition the ingredients of a fracturing fluid (particularly any fluid loss reducing agent employed) must be either soluble or dispersible either in water or oil. While not preferred, a water loss reducing agent may be merely swellable in water and/or oil if it can be easily converted to water and/or oil soluble or dispersible materials after the fracturing operation is completed so as not to substantially restrict the oil flow.

It has been found in accordance with the present invention that a fracturing fluid having to a high degree the desired properties set forth hereinbefore is provided by employing "rosin acid dimer" as a water loss reducing agent in combination with conventional friction reducing agents and suspending agents. Applicants' water loss reducing agents are substantially soluble in oil.

For the sake of clarity and simplicity hereinafter the present invention will be described for the most part with reference to water based fracturing fluids containing representative friction reducers and suspending agents in combination with applicants' water loss reducing agents (i.e. rosin acid dimer). However, it will be understood that the invention is not limited thereto since the gist of the present invention is applicants' discovery that rosin acid dimer gives the desired low fluid loss properties, together with the other desired properties, and the particular friction reducer, suspending agent and other ingredients employed (including amounts of such conventional materials) are not critical to obtaining the improvement imparted by the present invention.

The following examples, wherein parts and percent are by weight unless otherwise indicated, illustrate specific embodiments of the present invention. These examples are not intended to restrict the invention beyond the scope of the appended claims. These examples show the excellent water loss characteristics of fracturing fluids in accordance with the present invention. In these examples a high pressure filter press was employed. The press consisted of a heating well equipped with a thermostat, a filter cell, a pressure unit, and filter paper. In each case the water was heated to 150° F. and the other ingredients mixed with it for 35 seconds. The resulting mixture was placed in the filter cell and subjected to 750 pounds pressure. The milliliters of fracturing fluid which passed through the filter paper was measured after intervals of approximately 1, 15 and 35 minutes. This method of measuring the fluid loss characteristics of a fracturing fluid gives results which correlate well with actual field operations. In order to perform as desired in actual field use a fracturing fluid must give fluid loss values in accordance with this method which do not exceed about 60 milliliters after approximately 35 minutes.

The "rosin acid dimer" used in the examples is available commercially under the name "Dymerex." It is a pale colored thermoplastic resin comprising approximately 80%–90% by weight of dimeric rosin acids and having the following physical properties:

Softening point:
 Hercules drop method, ° C. _____ 152
 ASTM ball and ring, ° C. _____ 139
Acid number _____ 143
Saponification number:
 Regular _____ 145
 Diethylene glycol _____ 157
Unsaponifiable matter, percent _____ 6.1
Color (U.S.D.A. rosin scale) _____ M
Gasoline insoluble _____ Nil
Molecular weight (in acetone) _____ 502
Sulfur (Hercules lead oxide reactivity test) ___ Negative
Density at 20° C. _____ 1.069
Bromine number (KBr–KBrO$_3$ Method) _____ 93
Hydrogen absorption, percent _____ 0.51
Ash content, percent _____ 0.005
Liebermann—scorch test _____ Positive
Specific rotation _____ –23.2°
Weight per U.S. gallon _____ 8.91
Flash point (Cleveland Open Cup), ° F. _____ 487

Rosin acid dimers suitable for use herein may be prepared by conventional methods well known to the prior art. These, in general, involve treating rosin with a suitable polymerization catalyst, e.g., a strong acid such as sulfuric or phosphoric acid, an amphoteric metal halide such as aluminum chloride, zinc chloride, or boron trifluoride, an acid salt such as sodium acid sulfate, and so on. The rosins utilized may be ordinary gum, wood or tall oil rosin, specially refined and/or purified rosins and so on. The Dymerex used in the examples was first ground so that all passed through a 100-mesh screen. Dymerex which was first ground so that all passed through a 250-mesh screen gave equally as good results. Dymerex which was first ground to a considerably larger screen size than 100 mesh gave satisfactory results but not as good as the results obtained with the finer ground Dymerex. Thus very coarse Dymerex can be used but it is preferred to use Dymerex having a screen size not greater than about 50 mesh. A specifically preferred Dymerex is one having a screen size not greater than about 100 mesh. Dymerex having a screen size smaller than 250 mesh can also be employed. The screens referred to are U.S. standard series.

It is intended that the terms "Dymerex" and "rosin acid dimer" have the meaning set forth hereinbefore.

The term "water" as used herein is intended to include water as such or water which contains one or more various salts, particularly inorganic salts. These salts may include such materials as, for example, the alkali metal chlorides and the alkaline earth metal chlorides. If the salts are present, usually it will be because the water employed already contains them or because they are encountered in the formation being fractured.

Further setails are given in table 1 hereinafter.

synthetic and natural polymers in general have been used as friction reducers in fracturing fluids. These include, for instance, cellulose ethers and acrylic polymers (e.g. polymers and copolymers of acrylamide, acrylic acid, substituted acrylic acid, acrylic acid salts and substituted acrylic acid salts). Likewise, as is well known in this art, many suspending agents have been employed. Perhaps the most freqeuntly used are the natural gums, e.g. karaya, guar, Irish moss, algin, sodium alginate, agar, and the like. Sometimes a friction reducing agent may also aid in suspending, sometimes a suspending agent may also aid in reducing friction, and sometimes either or both may aid in reducing water loss. Moreover, it is possible for a water loss reducing agent to also aid in friction reduction and/or suspending. The amounts of friction reducer and suspending agent which may be used are not critical and are well known in this art. Thus the present invention is applicable for providing a fracturing fluid of substantially reduced water loss and other desired properties disclosed hereinbefore irrespective of the particular friction reducer, suspending agent, or other conventional ingredients, or the amounts of each employed.

As many apparent and widely different embodiments of this invention may be made without departing from the spirit and scope thereof, it is to be understood that the invention is not limited to the specific embodiments thereof except as defined in the appended claims.

| | Medium | | Friction reducer | | Suspending agent | | Fluid loss agent | | Ml. of Fluid loss, min.[1] | | |
|---|---|---|---|---|---|---|---|---|---|---|---|
| | Type | Parts | Type | Parts | Type | Parts | Type | Parts | 1 | 15 | 35 |
| Ex. Nos.: | | | | | | | | | | | |
| 1 | Water | 1,000 | HEC | 1.5 | Karaya gum | 1.0 | Dymerex | None | 36 | 67 | 80 |
| 2 | do | 1,000 | HEC | 1.5 | do | 1.0 | do | 0.1 | 25 | 48 | 56 |
| 3 | do | 1,000 | HEC | 1.5 | do | 1.0 | do | 2.5 | 8 | 17 | 23 |
| 4 | Water [2] | 1,000 | HEC | 4.0 | do | 0.3 | do | None | 9 | 16 | 18 |
| 5 | do [2] | 1,000 | HEC | 4.0 | do | 0.3 | do | 0.875 | 4 | 10 | 12 |
| 6 | Water [3] | 1,000 | HEC | 1.5 | Poly(sodium acrylate)[4] | 1.0 | do | None | 65 | 104 | 114 |
| 7 | do [3] | 1,000 | HEC | 1.5 | do [4] | 1.0 | do | 2.5 | 29 | 41 | 49 |

[1] Press and procedure described in API Code RP10B, Sec. 5, pages 7 and 8, 13th ed., March, 1964. In each test the fluid was passed through 2 sheets of No. 988 Baroid filter paper.
[2] Contained 10% NaCl.
[3] Contained 2% CaCl₂.
[4] Commercially available under the name "GEL GUARD M."

From the foregoing examples it will be seen that the fracturing fluid of the present invention gives water loss values far below those of fracturing fluids without Dymerex both in water and in aqueous salts.

Although the amount of Dymerex is important, it is not critical and may vary considerably. While about 0.062%–1.25% Dymerex gives satisfactory results, about 0.125%–0.375% Dymerex by weight of the fracturing fluid composition is preferred. This corresponds to approximately 5–100 and 10–30, respectively, pounds of Dymerex per 1000 gallons of water.

The contribution of the present invention comprises primarily the provision of a material (Dymerex) which imparts very low and desirable water loss properties to otherwise conventional fracturing fluids. For this reason the present invention has been described hereinbefore with reference to fracturing fluids containing Dymerex in combination with only the typical ones of the conventional ingredients such as e.g. friction reducer and suspending agent. However, the present invention is not limited to such compositions but includes fracturing fluids containing applicants' Dymerex water loss reducing agent in combination with conventional friction reducers and suspending agents and other ingredients in general. These conventional ingredients, both as to type and amounts employed, are well known in the art. The particular hydroxyethyl cellulose (HEC) friction reducer employed in the foregoing examples had a molecular substitution (M.S.) value of 2.5 and a Brookfield 1% aqueous solution viscosity of 3000–4500 cps. at 25° C. However any water soluble HEC is applicable. As is well known in the art,

What we claim and desire to protect by Letters Patent is:

1. A four-component fracturing fluid composition consisting essentially of
   (a) a sufficient amount of rosin acid dimer to substantially reduce the fluid loss of said fracturing fluid composition,
   (b) a sufficient amount of hydroxyethyl cellulose to substantially reduce the friction of said fracturing fluid composition,
   (c) a sufficient amount of karaya gum to substantially thicken said fracturing fluid composition, and
   (d) water.

2. A four-component fracturing fluid composition consisting essentially of
   (a) rosin acid dimer in an amount of about 0.06%–1.25% by weight of said fracturing fluid composition,
   (b) a sufficient amount of hydroxyethyl cellulose to substantially reduce the friction of said fracturing fluid composition,
   (c) a sufficient amount of karaya gum to substantially thicken said fracturing fluid composition, and
   (d) water.

3. A four-component fracturing fluid composition consisting essentially of
   (a) rosin acid dimer in an amount of about 0.125%–0.37% by weight of said fracturing fluid composition,
   (b) a sufficient amount of hydroxyethyl cellulose to substantially reduce the friction of said fracturing fluid composition, (c) a sufficient amount of karaya gum to substantially thicken said fracturing fluid composition, and
(d) water.

References Cited
UNITED STATES PATENTS

| | | | |
|---|---|---|---|
| 3,081,260 | 3/1963 | Park | 252—8.5 |
| 3,102,548 | 9/1963 | Smith et al. | 137—13 |
| 3,153,450 | 10/1964 | Foster et al. | 252—8.55 X |
| 3,254,719 | 6/1966 | Root | 166—42 |
| 3,319,716 | 5/1967 | Dill | 166—42 |

HERBERT B. GUYNN, Primary Examiner

U.S. Cl. X.R.

137—13; 166—42